United States Patent [19]

Hamasaki et al.

[11] Patent Number: 5,074,825
[45] Date of Patent: Dec. 24, 1991

[54] HYDRAULIC TRANSMISSION COUPLING APPARATUS

[75] Inventors: Yoshiaki Hamasaki; Takao Tamagawa; Shuzo Hirakushi; Yoshihiro Nakagawa, all of Osaka, Japan

[73] Assignee: Koyo Seiko Co., Ltd., Osaka, Japan

[21] Appl. No.: 495,852

[22] Filed: Mar. 19, 1990

[30] Foreign Application Priority Data

Mar. 20, 1989 [JP] Japan .................. 1-31601[U]
Nov. 24, 1989 [JP] Japan .................. 1-306217

[51] Int. Cl.⁵ .................. F16D 31/02; B60K 17/35
[52] U.S. Cl. .................. 464/2; 180/248; 192/60; 464/160
[58] Field of Search .................. 464/2, 160; 180/248; 192/60

[56] References Cited

U.S. PATENT DOCUMENTS

| | | | |
|---|---|---|---|
| 4,676,336 | 6/1987 | Hiramatsu et al. | 180/223 |
| 4,727,966 | 3/1988 | Hiramatsu et al. | 192/33 |
| 4,829,769 | 5/1986 | Hiramatsu | 60/727 |
| 4,850,447 | 7/1989 | Hirakushi et al. | 180/248 |
| 4,881,626 | 11/1987 | Hiramatsu | 192/60 |
| 4,940,125 | 7/1990 | Sato et al. | |

FOREIGN PATENT DOCUMENTS 1-250625 10/1989 Japan.
A921821 3/1963 United Kingdom.

*Primary Examiner*—Thomas R. Hannon
*Attorney, Agent, or Firm*—Darby & Darby

[57] ABSTRACT

A hydraulic transmission coupling apparatus which is used instead of a center differential or a viscous coupling being usually mounted between a front wheel drive shaft and a rear wheel drive shaft of a four-wheel drive vehicle, and transmits driving force existing between the two shafts. The hydraulic transmission coupling apparatus is provided with a vane-type hydraulic pump which generates hydraulic pressure corresponding to a relative rotation speed difference of the two drive shafts and a variable throttle valve being disposed in the passage connecting a discharge port of the hydraulic pump with a tank, whose opening area varies according to the hydraulic pressure generated by the hydraulic pump, thereby driving force to be transmitted being increased or decreased steeply as the rotation speed difference becomes larger.

11 Claims, 13 Drawing Sheets

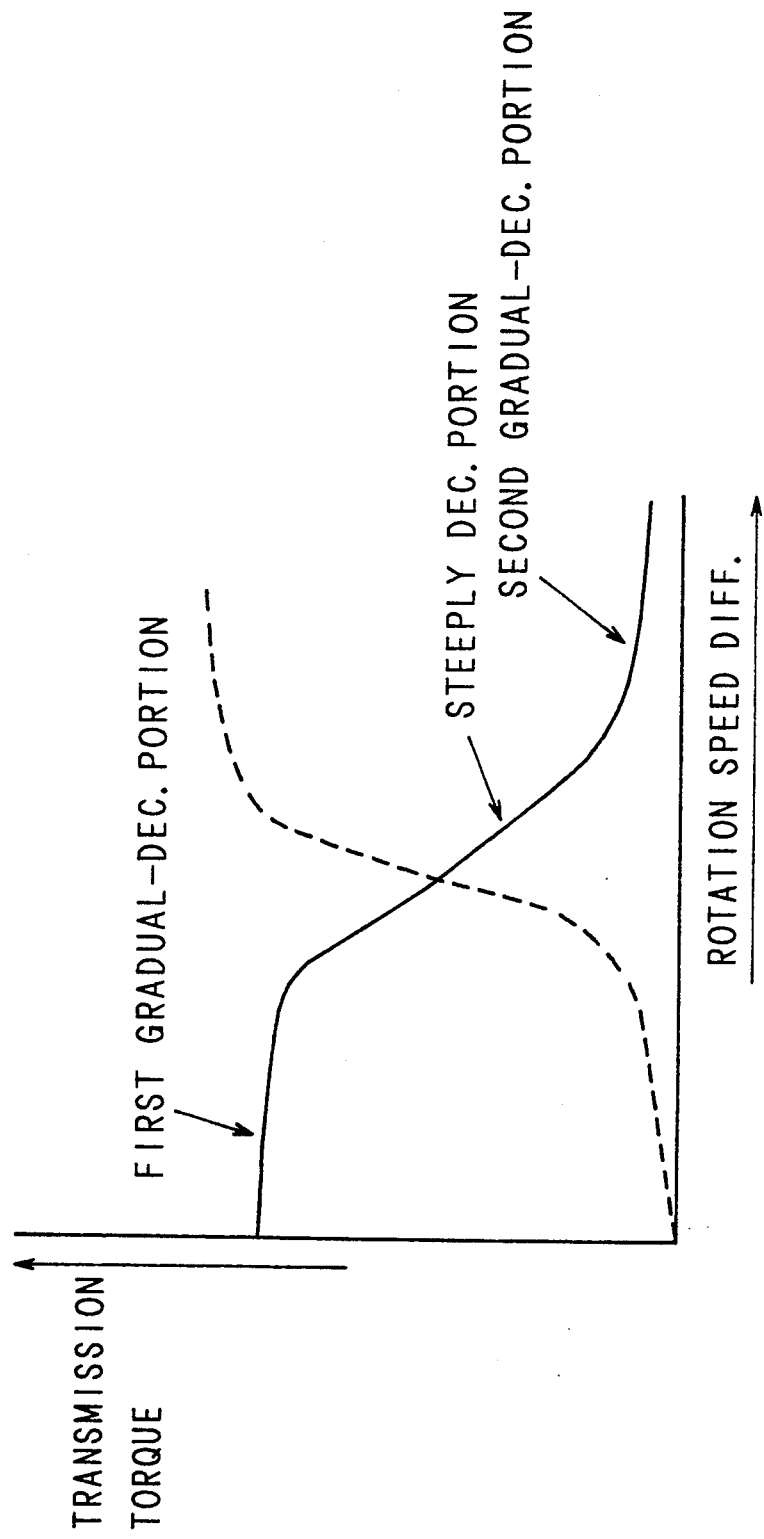

HYDRAULIC TRANSMISSION COUPLING APPARATUS

BACKGROUND OF THE INVENTION

1. Field of the Invention

The present invention relates to a hydraulic transmission coupling apparatus using generated hydraulic pressure of a hydraulic pump, especially a vane pump, as a transmitting means for a driving force existing between front and rear wheels.

2. Description of Prior Art

As a four-wheel drive vehicle is superior in running stability not only on a specific surface such as a snow-covered road and a gravel road, but also on a usual road even at a time of accelerating or decelerating and of high speed running, it has especially recently been spotlighted for its comfortable running without being affected by the road condition and running state. The full time four-wheel drive vehicle having, on the way of a transmission shaft between front and rear wheels, a transmission coupling apparatus which distributes the driving force corresponding to a rotation speed difference generated between the front and rear wheels, prevents the so-called tight corner breaking phenomenon and is a leading figure in the four-wheel drive vehicle of this kind. The tight corner breaking phenomenon is the one in which a rotation speed difference can not be absorbed, thereby the inside rear wheel being dragged in a condition of slipping, in the case where the rotation speed difference is created between the front and rear wheels due to the turning radial difference between the front and rear wheels at the time of turning. When the tight corner breaking phenomenon is created, there is a fear that it not only brings about bad steering feeling, but leads a propeller shaft between the front and rear wheels to be twisted or causes abnormal wearing at a tire.

As a transmission coupling apparatus for preventing aforesaid tight corner breaking phenomenon, there is a hydraulic transmission coupling apparatus using a hydraulic pump, especially a vane pump which is easily small-sized and light-weighted, and is superior in durability.

A vane pump is well-known, being comprised of a rotor and a casing. The rotor of a short cylindrical body has a plurality of grooves, each of which is of a predetermined depth in the radial direction thereof in almost the same interval from the next in the peripheral direction. A plate-like vane is slidably interposed to each groove. The casing is constructed by installing side plates on both sides of an annular cam ring of wall eccentricity, having space surrounded by these cam ring and side plates inside thereof. In the inside space of aforesaid casing, aforesaid rotor is coaxially and rotatably stored. In a space between the outer circumferential surface of aforesaid rotor and the inner circumferential surface of the cam ring, a plurality of pump chambers having a crescent section, surrounded by these rotor and cam ring and aforesaid side plates, are formed. The vane pump is so constructed as to pressurize hydraulic fluid which has been drawn from a suction port positioned at an end portion of the crescent portion of each pump chamber by rotating the hydraulic fluid being in the condition of being confined between the adjoining vanes corresponding to the rotation of the rotor, and to discharge it from a discharge port positioned at the other end portion of the crescent portion.

In the hydraulic transmission coupling apparatus using vane pumps of this kind, aforesaid rotor is fixed to the shaft connected to one of the front and rear wheels and aforesaid casing to the shaft connected to the other respectively and coaxially. The hydraulic transmission coupling apparatus is designed to create, between the rotor and the casing, relative rotation corresponding to the rotation speed difference between the front and rear wheels, to generate the hydraulic pressure corresponding to the relative rotation at each of aforesaid pump chambers, and to transmit the driving force between the rotor and the casing by the resistance force created according to the hydraulic pressure. In such a hydraulic transmission coupling apparatus, as the casing rotates interlockingly with one of the front and rear wheels, that is, it is not fixedly installed, the hydraulic fluid of the vane pump is, as is disclosed in Japanese Patent Application Laid-Open No. 1-250625 by the inventors, confined in an annular hydraulic tank formed between a cylindrical surrounding member of wall eccentricity installed on the casing in the condition of surrounding the outside of the casing and the outer periphery of aforesaid casing. The hydraulic fluid is drawn to each of aforesaid pump chambers through a suction oil passage which opens at the outer periphery of the side plate and communicates with aforesaid suction port. And also as disclosed in aforesaid Laid-Open Application, each vane has a throttle hole of a small diameter which passes through both sides of the vane. A part of hydraulic fluid confined between the adjoining vanes is made to be leaked from high pressure side to low pressure side by passing through the throttle holes so as to obtain generated pressure corresponding to the conduction resistance at this time. In addition, discharged hydraulic fluid from the discharge port is drawn to a bottom part of a storage groove of each vane through a communication groove formed annularly at the side of the rotor, this hydraulic pressure pressuring each vane in the outward radial direction, thereby a head of each vane is surely slidably fitting the inner circumferential surface of the cam ring.

Next, in the transmission coupling apparatus used for a four-wheel drive vehicle, it is important for transmission torque to show proper transmission characteristic against the increase or decrease of the rotation speed difference generated between the front and rear wheels. The proper transmission characteristic is the one which makes the transmission torque smaller in the case where the rotation speed difference is small as in the turning or the like, and makes the transmission torque larger in the case where the rotation speed difference is large as in the running on snow-covered road or running on upward slope. Thereby, in the case where the rotation speed difference is small, the rotation speed difference can be absorbed by making the transmission torque smaller, and the tight corner breaking phenomenon is prevented. In the case where the rotation speed difference is large, the driving force is transmitted to the four wheels reliably by making the transmission torque larger, leading to stable running in these running conditions.

Therefore, in the hydraulic transmission coupling apparatus employing a vane pump, it is important for the pressure in the pump chamber to show proper transmission characteristic against the increase or decrease of the relative rotation speed between the rotor and the casing.

In the conventional transmission coupling apparatus constructed as above-mentioned, the increase or decrease characteristic of aforesaid pressure depends upon the flow resistance at the throttle hole formed at each vane, and upon the conduction resistance created when the hydraulic fluid drawn to the bottom part of the storage groove, in aforesaid way, leaks from the gap between the side surface of the side plate and that of the rotor to the low pressure portion. For this reason, in order to realize the proper characteristic, high accuracy in processing a throttle hole at each of a plurality of vanes is required. Therefore, it is a problem that the processing cost of vanes is very expensive.

In addition, the hydraulic fluid of the vane pump is confined inside the fluid tank of an aforesaid construction, whose size having a limit, and stirred by the rotation of the rotor. Therefore, in the case where large rotation speed difference is created between the front and rear wheels at the time of running on snow-covered road or upward slope, thereby the running state requiring high transmission torque continues for a long time, the temperature of hydraulic fluid rises as it is continued to be stirred, resulting in lowering of the viscosity of the hydraulic fluid inevitably. The transmission of the driving force between the front and rear wheels, as afore described, is carried out by resistance force generated between the rotor and the casing, corresponding to the pressure of the inside of the pump room. The generated pressure inside of the pump room depends upon the flow resistance of the throttle hole provided at the vane and the flow resistance of the gap between the rotor and the side plate. Accordingly, the generated pressure based on the same rotation speed difference decreases as the viscosity lowers. In the case where the same generated pressure is obtained, aforesaid resistance generated by the rotation speed difference decreases as the viscosity lowers. For this reason, the temperature rise of the hydraulic fluid brings about the lowering of transmission torque based on the same rotation speed difference. The transmission characteristic of transmission torque against the rotation speed difference, as shown in FIG. 1, equally decreases as the temperature of the hydraulic fluid rises. Especially in the case where the rotation speed difference is large, transmission torque is largely decreased. Therefore, in order to obtain the same transmission torque at the time of high temperature as the one at the time of low temperature, the rotation speed difference larger than that at the time of low temperature is required.

In such a conventional apparatus, in the case where the high transmission torque is to be obtained, a large rotation speed difference is required. But it is a problem that the hydraulic fluid is heated by the large rotation speed difference, thereby the desired transmission of torque cannot be carried out.

SUMMARY OF THE INVENTION

The present invention has been devised in consideration of above-mentioned circumstances. The primary object of the present invention is to provide a hydraulic transmission coupling apparatus which makes the processing cost less expensive by providing the variable throttle means whose opening ratio varies corresponding to the hydraulic pressure on the passage connecting the discharge port of the hydraulic pressure pump with the tank, and by removing of the throttle hole of the vane, transmits low torque to prevent generation of the tight corner breaking phenomenon in the case where the rotation speed difference is small, and transmits high torque with the rotation speed difference as small as possible to prevent the temperature rise of the hydraulic fluid in the case except the above.

Another object of the present invention is to provide a hydraulic transmission coupling apparatus which is capable of obtaining aforesaid desired transmission characteristic regardless of the moving direction of the spool in the variable throttle means by providing a passage communicating with the low pressure tank at the spool and/or the restricting member in the case where the throttle valve, having the spool which is moved by receiving the hydraulic pressure and the restricting member which restricts the movement of the spool, is used as the variable throttle means.

Still another object of the invention is to provide a hydraulic transmission coupling apparatus which is capable of realizing various kinds of driving force transmission characteristics by providing a fixed throttle means between the low pressured tank and the variable throttle means, whose opening ratio varies according to the hydraulic pressure generated by the operation of the fixed throttle means.

In order to attain the first object, the hydraulic transmission coupling apparatus of the present invention, wherein two rotary shafts are connected by the hydraulic pressure pump generating hydraulic pressure corresponding to the relative rotation speed difference therebetween, is characterized by the fact that it is provided, in the fluid passage at the discharge side of aforesaid hydraulic pressure pump, with a variable throttle means whose opening ratio varies according to aforesaid hydraulic pressure.

In the present invention, in the case where the opening ratio of aforesaid variable throttle means varies corresponding to the hydraulic pressure and the pressure of fluid passage of the hydraulic fluid changes, the pressure generated inside of the hydraulic pressure pump increases or decreases corresponding to said change and frictional resistance generated between the rotor and the casing of aforesaid pump increases or decreases, thereby the transmission torque between the two rotary shafts in the hydraulic transmission coupling apparatus being adjusted.

In order to attain the second object, the hydraulic transmission coupling apparatus of the present invention is provided with a spool being moved by receiving hydraulic pressure and a restricting member for restricting the movement thereof in the by-pass fluid passage heading toward the low pressure tank provided at the discharge side of the hydraulic pressure pump which generates hydraulic pressure corresponding to the rotation speed difference between the two rotary shafts and communicates both of the shafts, and also is provided with a variable throttle means which opens or closes aforesaid by-pass fluid passage according to aforesaid movement. It is characterized by the fact that it is provided with a communicating passage, which communicates the space surrounded by aforesaid spool and aforesaid restricting member at the time of complete closing of aforesaid variable throttle means with aforesaid low pressure tank, at a part of the spool or a part of the restricting member.

Accordingly, in the present invention, inflow or outflow of hydraulic fluid is usually created, in the surrounded space by the spool and the member restricting the movement of the spool, through the communicating passage formed at aforesaid spool or the restricting member, thereby there is no fear that the movement from closing state to opening state of aforesaid spool is obstructed.

In order to attain the third object, the hydraulic transmission coupling apparatus of the invention is provided with a by-pass fluid passage heading toward the low pressure tank at the discharge side of the hydraulic pressure pump which generates hydraulic pressure corresponding to the rotation speed difference between the two rotary shafts to communicate both of the shafts. It is characterized by the fact that a throttling fluid passage is provided in aforesaid by-pass fluid passage, a space whose conduction area is larger than that of aforesaid throttling fluid passage and a spool being moved by receiving the pressure of aforesaid space being communicated with aforesaid by-pass fluid passage, and that a variable throttle means for opening or closing aforesaid by-pass fluid passage according to aforesaid movement is provided at the more upstream side than aforesaid throttling fluid passage.

In the present invention, when the rotation speed difference between the front and rear wheels becomes larger, thereby discharge pressure of the hydraulic pressure pump is larger and the flow of the by-pass fluid passage increases, discharged fluid of the hydraulic pressure pump which has inflowed, through the variable throttle means, to the space at the more upstream side than the throttling fluid passage is pressurized by the throttling effect of the throttling fluid passage, and the spool is moved by receiving the pressure of this space. In the case where the by-pass fluid passage is set to open by the movement of the spool of the variable throttle means due to aforesaid pressure-receiving, the characteristic at that time is that the transmission force of the driving force decreases corresponding to the increase of the flow of aforesaid discharged fluid, and in the case where the by-pass fluid passage is set to close by the movement of the spool of the variable throttle means due to aforesaid pressure-receiving, the characteristic at that time is that the transmission force of the driving force increases corresponding to the increase of flow of the pressure fluid. In this way, when the opening or closing characteristic of by-pass fluid passage against the movement of the spool is properly changed, a plurality of coupling characteristics of both wheels corresponding to the flow of pressured fluid are obtained.

The above and further objects and features of the invention will more fully be apparent from the following detailed description with accompanying drawings.

BRIEF DESCRIPTION OF THE DRAWINGS

FIG. 13 is a graph showing a relation between the transmission torque and rotation speed difference of the apparatus of still another embodiment.

DESCRIPTION OF THE PREFERRED EMBODIMENTS

Figure 1:
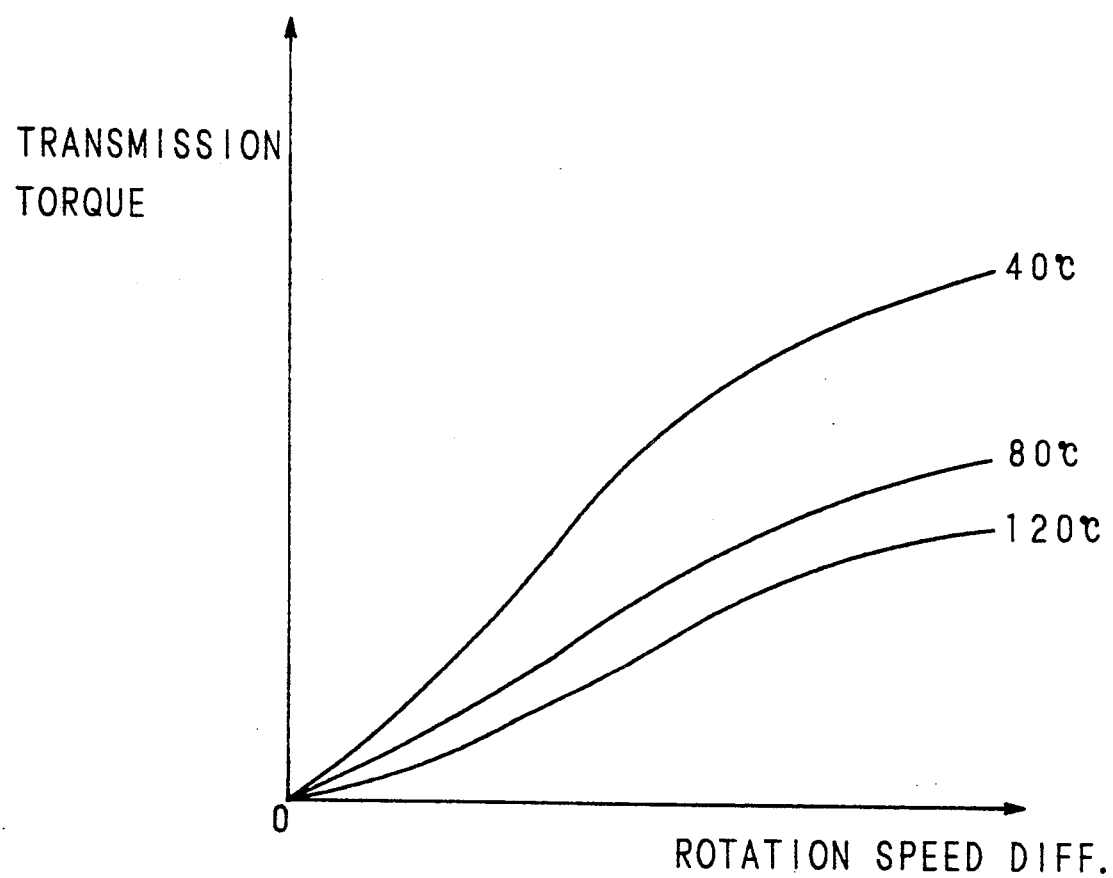
FIG. 1 is a graph showing the change of transmission torque due to the temperature of hydraulic fluid.
Figure 2:
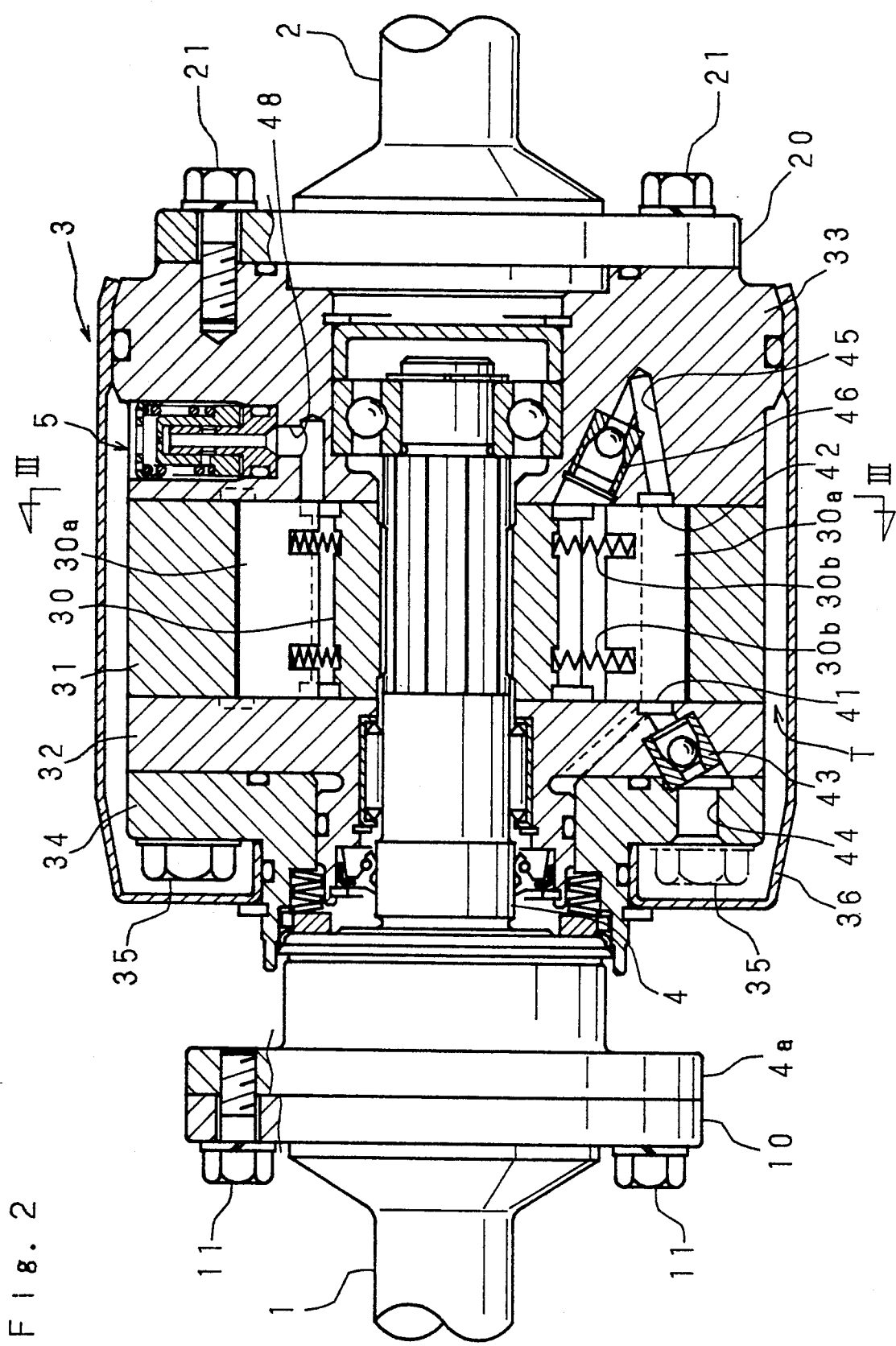
FIG. 2 is a longitudinal sectional view of the hydraulic transmission coupling apparatus according to the present invention.
Figure 3:
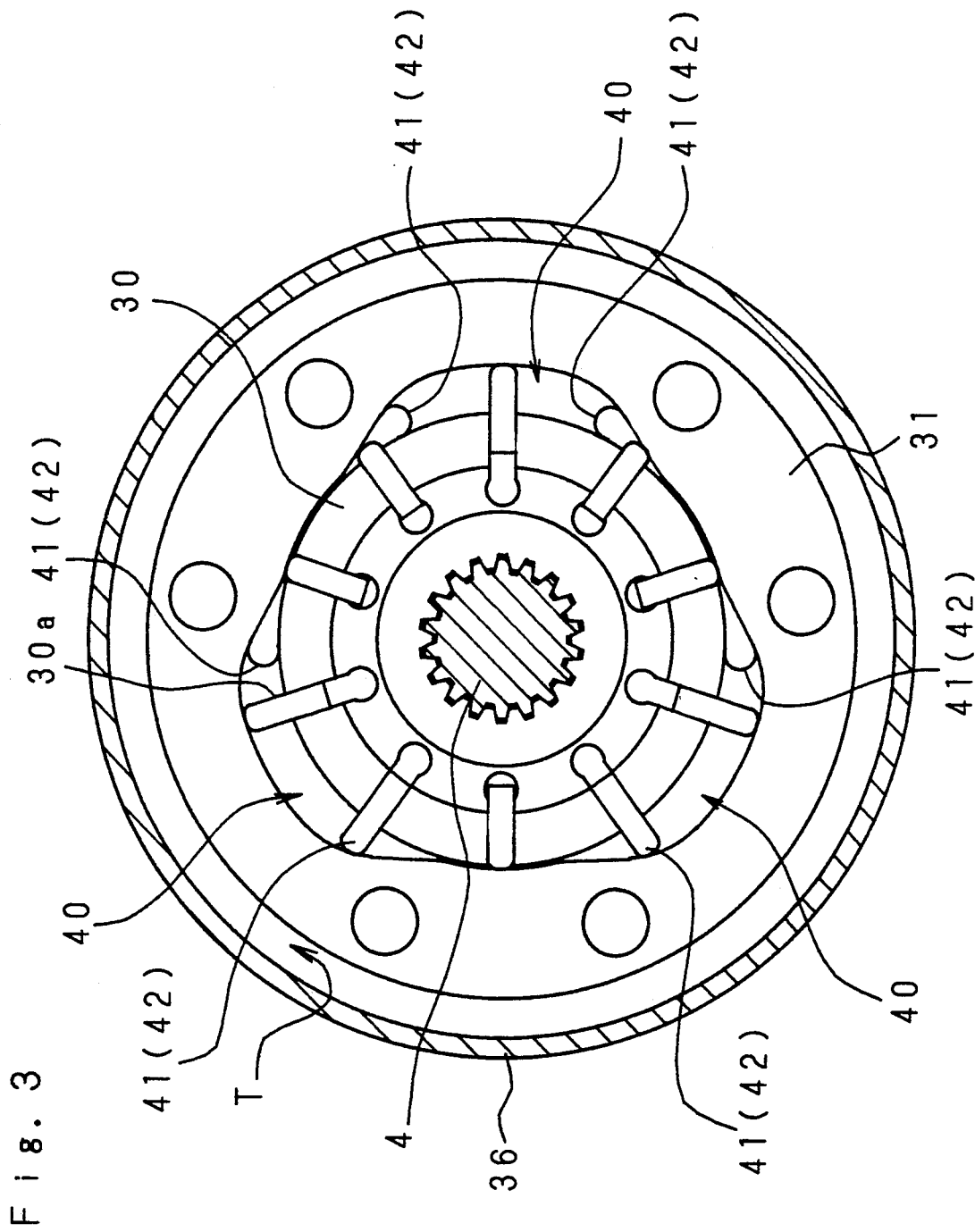
FIG. 3 is a horizontal sectional view along the III—III line shown in FIG. 2, FIG. 4 and FIG. 5 are enlarged longitudinal sectional views of main parts showing the construction of a variable throttle valve.

In the following, description is made referring to drawings showing the embodiments of the invention. FIG. 2 is a longitudinal sectional view of a transmission coupling apparatus for four-wheel drive vehicle according to the invention (hereinafter to be called the apparatus of the invention). FIG. 3 is a horizontal sectional view along the III—III line shown in FIG. 2. In the figures, reference numeral 1 is an input shaft which interlockingly rotates with one of the front and rear wheels, and reference numeral 2 is an output shaft which interlockingly rotates with another wheel. The apparatus of the invention is so constructed as to transmit from the input shaft 1 side to the output shaft 2 side the rotation speed difference generated between the input shaft 1 and the output shaft 2, that is, the driving force corresponding to the rotation speed difference generated between the front and rear wheels, with generated pressure of a hydraulic pressure pump interposed between both of the shafts 1 and 2 serving as an equalizer. As an aforesaid hydraulic pressure pump, a vane pump 3 as shown in the figure is employed.

The vane pump 3 is provided with a casing comprising a short cylindrical rotor 30, a cam ring 31 housing aforesaid rotor 30 coaxially, side plates 32 and 33 sandwiching both sides of the cam ring 31 therebetween, and the like. At the outer circumferential surface of the rotor 30, a plurality of storage grooves, each having a predetermined depth in the radial direction, are formed in almost the same intervals from the one to the next in the circumferential direction. Rectangular plate-like vanes 30a, 30a . . . are interposed into the respective storage grooves slidably in the radial direction. Between each vane 30a and the bottom part of the storage groove thereof, a pair of coil springs 30b, 30b which are paralleled in the axial direction are disposed. Each vane 30a is biased in the outward radial direction by the pair of coil springs 30b, 30b. On the other hand, the cam ring 31, being a configuration member of the casing, is a cylindrical member of wall eccentricity which has an inside periphery having three convex portions distributed in equal distance in the peripheral direction of a circle whose diameter is a little larger than the outer diameter of the rotor 30, and a circular outer periphery. The side plate 32 is a member wherein a short cylinder is provided successively and coaxially at the inner peripheral side of the disc with a hollow part in the center thereof having almost the same outer diameter as the cam ring 31. The side plate 33 is a disc-like member with a thick hollow part in the center thereof, having a part being a little larger diameter than the outer diameter of the cam ring 31. As shown in FIG. 2, the side plates 32 and 33 are respectively positioned at the both sides in the direction of axial length of the cam ring 31 coaxially. The side plates 32 and 33, and the cam ring 31, together with a pressing member 34 whose one portion is outfitted at the cylindrical portion of the side plate 32, are connected integrally by a plurality of fixing bolts 35 which screws down the tapped hole (not shown) formed at the side plate 33, penetrating aforesaid pressing member 34, side plate 32 and cam ring 31 in this order in the respective depth direction. At the outer side surface of the side plate 33, a connecting flange 20 formed at the end portion of the output shaft 2 is coaxially fixed by a plurality of fixing bolts 21, 21 . . . arranged in the peripheral direction with the same interval from the one to the next. Aforesaid casing is to rotate around the shaft center of the output shaft 2 and is connected to the output shaft 2 for joint rotation therewith. At the outside of the casing, a thin and cylindrical surrounding member 36, whose one portion outfitting respectively at the outer periphery of the side plate 33 and the outer periphery of the cylinder of the pressing member 34, is installed as shown in the FIG. 2. The hydraulic fluid of the vane pump 3 is confined in an annular fluid tank T formed between the surrounding member 36 and the outer periphery surface of the casing. In addition, at the casing, a rotor shaft 4 being the rotary shaft of the rotor 30 extends from the side plate 32. The rotor shaft 4 is supported coaxially by a needle roller bearing fixedly fitted into the cylindrical portion of the side plate 32 and a ball bearing fixedly fitted into the hollow part of the side plate 33. The rotor 30 is housed at the inner circumferential surface of the cam ring 31 and in the cavity formed between the opposing faces of the side plates 32 and 33, coaxially with them. The rotor 30 is spline-coupled with the rotor shaft 4 being outfitted between aforesaid supporting positions. At the end portion of the rotor shaft 4 projecting from the side plate 32 outside, a disc-like connecting flange 4a is formed. The flange 4a is coaxially fixed to a connecting flange 10 formed at the end portion of the input shaft 1 by a plurality of fixing bolts 11, 11 . . . . In such a way, the rotor 30 is coaxially connected to the input shaft 1 through the rotor shaft 4. As the rotor 30 rotates around the shaft center of the input shaft 1 together therewith upon rotation thereof, relative rotation corresponding to the rotation speed difference of the front and rear wheels is created between the casing which jointly rotates with the output shaft 2 and aforesaid rotor 30, as aforementioned.

As shown in FIG. 3, between the outer circumferential surface of the rotor 30 and the inner circumferential surface of the cam ring 31, three pump chambers 40, 40, 40, which generate hydraulic pressure inside thereof corresponding to aforesaid relative rotation, whose horizontal section being of crescent arc formed, corresponding to the respective positions of aforesaid convex portions. At both ends in the peripheral direction of each of the pump chambers 40, 40, 40, a pair of suction ports 41, 41 . . . which opens toward the side plate 32 side and a pair of discharge ports 42, 42 . . . which opens toward the side plate 33 side are respectively formed. Each suction port 41 is communicated with a fluid tank T by a suction passage 44 which penetrates the disc portion of the side plate 32 and the disc portion of the pressing member 34 in the depth direction. On the way of the suction passage 44, a suction check valve 43 is fitted which allows only the inflow to the pump chamber 40. In addition, the discharge port 42 is communicated with the bottom part of the storage groove of each of the vanes 30a, 30a . . . at the rotor 30, by a V-turn shaped passage 45 formed at the side plate 33 in the state of folding back in the V-turn shape toward the inward radial direction. On the way of the V-turn shaped passage 45, a discharge check valve 46 is fitted which allows only the outflow from the pump chamber 40. The bottom portion of the storage groove communicates with the hollow parts of the side plates 32 and 33 through a little gap existing between both side surfaces of the rotor 30 and the inside surfaces of the side plates 32 and 33. In addition, these hollow parts are communicated with the fluid tank T by the return hole (not shown) penetrating the side plate 33 toward outward radial direction. The apparatus of the present invention is provided with, at the discharge side of the vane pump 3, a discharge fluid passage which links the fluid tank T being the low pressure portion through aforesaid V-turn shaped passage 45, bottom portions of the storage grooves of the vanes 30a, 30a . . . , gap of both sides of the rotor 30, the hollow parts of the side plates 32 and 33, and through aforesaid return hole, and is also provided with a by-pass fluid passage 48 constructed individually from aforesaid discharge fluid passage. The by-pass fluid passage 48 is to by-pass the bottom portions of the storage grooves of the vanes 30a, 30a . . . which is a part of aforesaid discharge fluid passage to the fluid tank T. The by-pass fluid passage 48, as shown in the figure, is composed of a first portion having been formed with a proper depth toward the depth direction from the position corresponding to the bottom portion of the storage groove of the rotor 30 on the inside surface of the side plate 33, and a second portion formed toward the inward radial direction from the outer circumferential surface of the side plate 33, and intersecting the bottom portion of the first portion at almost a right angle. The second portion of the by-pass fluid passage 48 has a large diameter portion of a proper depth at the outer diameter portion of the side plate 33, the throttle valve 5 being the throttle means which characterizes the present invention is constructed inside of the large diameter portion.

Figure 4:
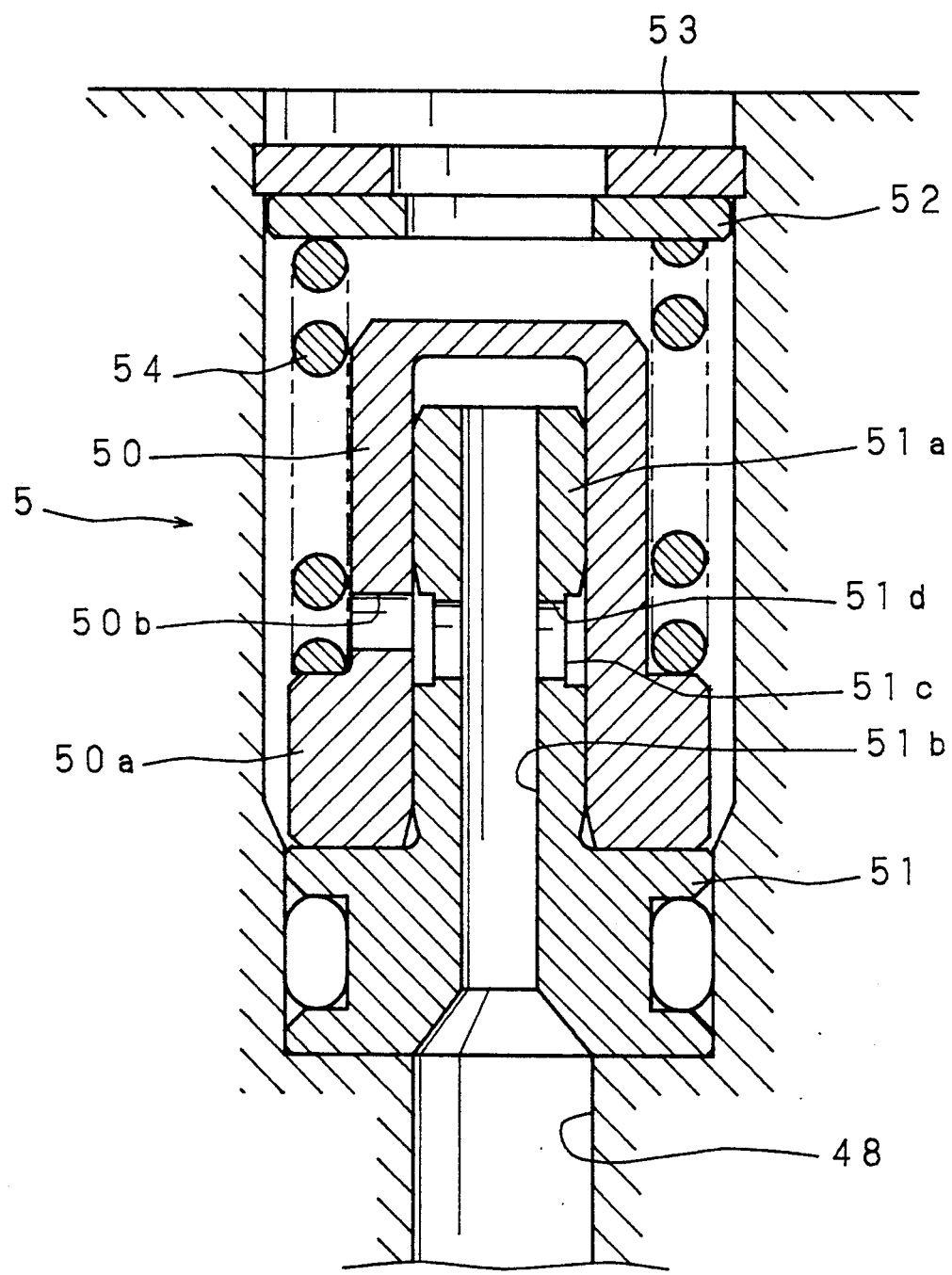
Figure 5:
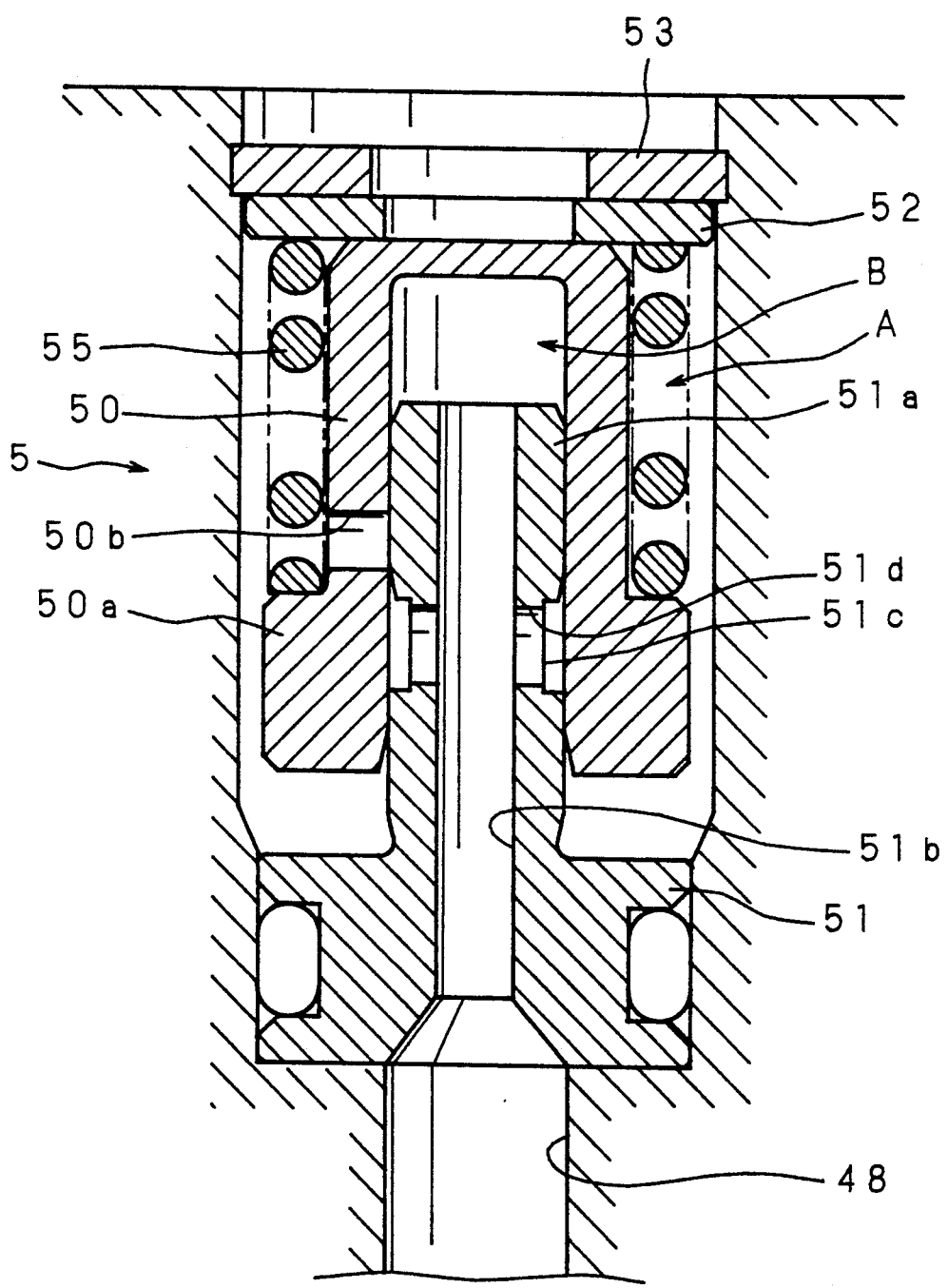

FIG. 4 and FIG. 5 are enlarged sectional views of main parts showing the construction of the variable throttle valve 5. The variable throttle valve 5 is comprised of a spool 50 which is moved by receiving the discharged pressure, and restricting members 51 and 52 which restrict the movement of aforesaid spool 50. At the bottom portion of the figure shows the discharge side of the vane pump 3, and the upper side thereof shows the fluid tank T whose pressure is maintained almost at the atmospheric pressure, the diameter of the by-pass fluid passage 48, as shown in the figure, being larger at the fluid tank T side. As aforementioned, aforesaid variable throttle valve 5 is constructed inside of the larger diameter portion of the by-pass fluid passage 48. One restricting member 51 is positioned at aforesaid discharge side and is fixed by pressure at the larger diameter portion. Over a guide bar 51a provided at the shaft center position of the restricting member 51, the cylindrical spool 50 having a bottom is slidably fitted. Aforesaid spool 50 is pressed toward aforesaid fluid tank T by the generated hydraulic pressure of the vane pump 3 acting upon the inside bottom surface after passing through a pressure introducing hole 51b penetrating the shaft center of the restricting member 51. The other restricting means 52 is fitted into the low pressure side of aforesaid larger diameter side, being fixed by a snap ring 53. At the place between aforesaid restricting member 52 and a spring catching portion 50a provided circumferentially at the opening side of the spool 50, a coil spring 54 is interposed which biases aforesaid spool 50 toward aforesaid discharge side. The spool 50 has a fluid passing hole 50b which penetrates the circumferential wall thereof inside and outside. The fluid passing hole 50b, when the spool 50 is fitted to reach the base of the guide bar 51a, is to be interfaced with an annular groove 51c being at the outer periphery of aforesaid guide bar 50a communicating with aforesaid pressure introducing hole 51b through a fluid passing hole 51d.

Accordingly, in the variable throttle valve 5, the sliding position of the spool 50 is determined by the balance between the generated hydraulic pressure of the vane pump 3 and the biasing force of the coil spring 54. In the case where the rotation speed difference between the front and rear wheels is small and aforesaid generated hydraulic pressure is low, as shown in FIG. 4, aforesaid fluid passing hole 50b is in the complete opening state as the spool 50 is pressed against the restricting member 51 by the biasing force of coil spring 54. On the other hand, in the case where the rotation speed difference between the front and rear wheels is large and aforesaid generated hydraulic pressure is high, as shown in FIG. 5, aforesaid fluid passing hole 50b is in the complete closing state as the spool 50 is pressed against the restricting means 52 by the hydraulic pressure acting upon the bottom surface of the spool 50. The flow resistance of the discharge side of the vane pump 3 is the sum of the flow resistance at the regular discharge fluid passage and the flow resistance at aforesaid by-pass fluid passage 48. Although the generated pressure of the vane pump 3 is created against the flow resistance of the discharge side of the vane pump 3, the flow resistance of the by-pass fluid passage 48 depends upon the opening area of aforesaid fluid passing hole 50b which varies according to aforesaid movement of the spool 50.

Figure 6:
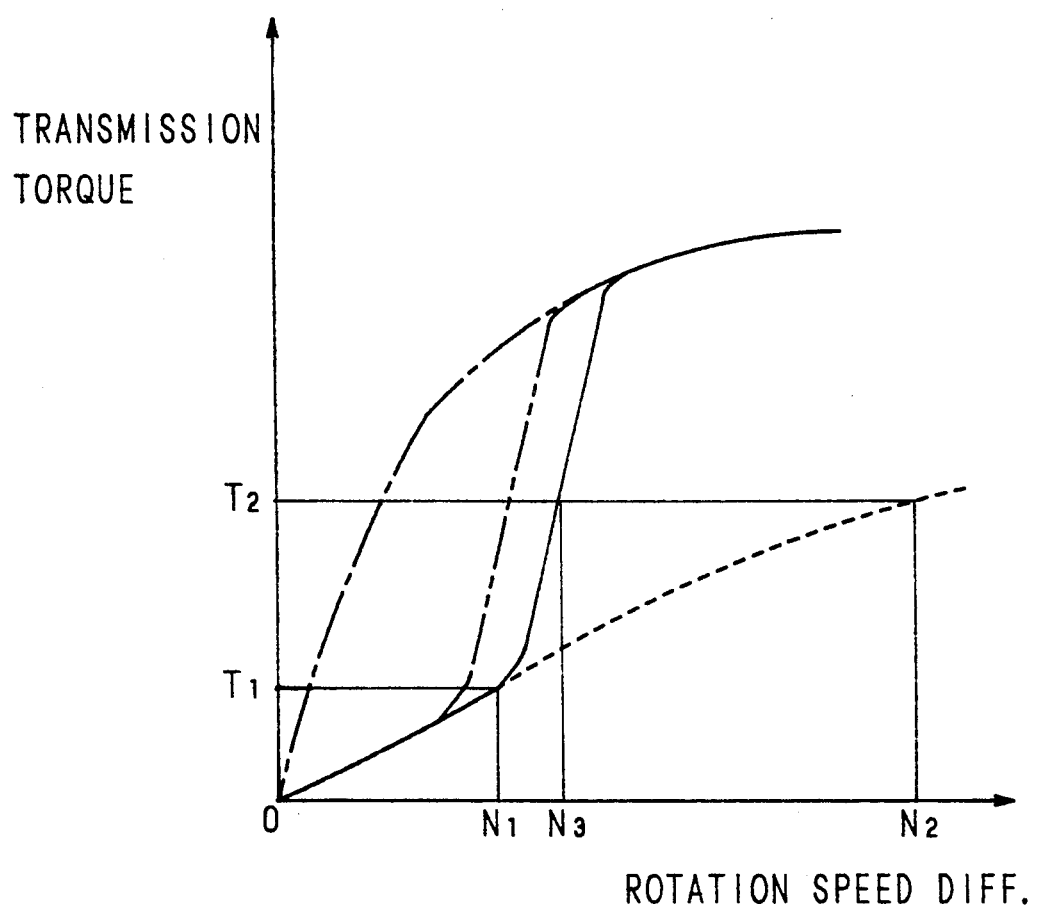
FIG. 6 is a graph showing a relation between the rotation speed difference and the transmission torque of the apparatus of the present invention.

FIG. 6 shows the effect which aforesaid opening area of the fluid passing hole 50b has on the transmission of torque between the front and rear wheels.

FIG. 6 is a graph showing a relation between the rotation speed difference and the transmission torque in the present apparatus. In the graph, the abscissa shows the rotation speed difference and the ordinate shows the transmission torque. In the figure, the solid line represents the transmission torque characteristic of the apparatus of the present invention, the broken line shows the transmission torque characteristic in the case where the opening area of the aforementioned fluid passing hole 50b is maximum, and the dashed line shows the transmission torque characteristic in the case where aforesaid fluid passing hole 50b is in the complete closing state.

As understood from FIG. 6, in the apparatus of the present invention, the generated pressure of the vane pump 3 is suppressed to be low, thereby transmission torque being limited to be low as the opening area of the fluid passing hole 50b becomes the maximum in the case where the rotation speed difference is small.

In the figure, symbol $N_1$ is the rotation speed difference in which the pressure generated by the vane pump 3 exceeds the biasing force of coil spring 54. Until the rotation speed difference reaches $N_1$, the opening area of the fluid passing hole 50b is the maximum, and the transmission torque is suppressed to $T_1$ or below.

When the rotation speed difference exceeds $N_1$, and the hydraulic pressure exceeds the predetermined value, the pressure of the hydraulic pump steeply increases because the opening area of the fluid passing hole 50b decreases gradually as afore-described, thereby the transmission torque steeply increases. In the case where the pressure increases in succession, and the fluid passing hole 50b is in the complete closing state, the increase of transmission torque becomes slow, and the transmission torque characteristic coincides with the characteristic of the case where the fluid passing hole 50b is in the complete closing state. As obvious from the figure, the rotation speed difference of $N_2$ is required in order to generate the transmission torque of $T_2$ in the conventional apparatus, but in the apparatus of the present invention, it is possible to generate the transmission torque of $T_2$ by the rotation speed difference of $N_3$ which is smaller than $N_2$, thereby the hydraulic fluid can be prevented from being overheated.

Next, explanation is given for another embodiment of the invention. As explained in aforesaid embodiment, the desired transmission characteristic can be obtained by providing the variable throttle valve 5 in the by-pass fluid passage 48.

In such a variable throttle valve 5, however, in the case where the spool 50 is at the position for sliding, as shown in FIG. 5 and the fluid passing hole 50b is in the complete closing state, an annular space A surrounded by the spool 50 and the restricting member 52 is created outside of the spool 50, and inside of the spool 50, a pillar-like space B surrounded by the bottom surface of the spool 50 and the head face of the guide bar 51a of the restricting member 51 is created. Since these spaces are in almost completely confined state, when the spool 50 is to be returned to the side at which the fluid passing hole 50b is released, that is, at the position shown in FIG. 4, there is a fear that this returning operation is obstructed by the hydraulic fluid in aforesaid annular space A and pillar-like space B. Accordingly, the curve showing the transmission characteristic of the driving force obtained during the returning operation of the spool 50, as shown by two-dot chain line in FIG. 6, is the one obtained by shifting a curve which originally shows the transmission characteristic to the side where the rotation speed difference is small. In the transmission characteristic, hysteresis accompanying the difference of the moving direction of the spool 50 is created. In the four-wheel drive vehicle provided with the transmission coupling apparatus, there was a fear that uncomfortable feeling originated in the hysteresis is brought about during the running.

This embodiment is to obtain the constant transmission characteristic in spite of the moving direction of the spool 50.

Figure 7:
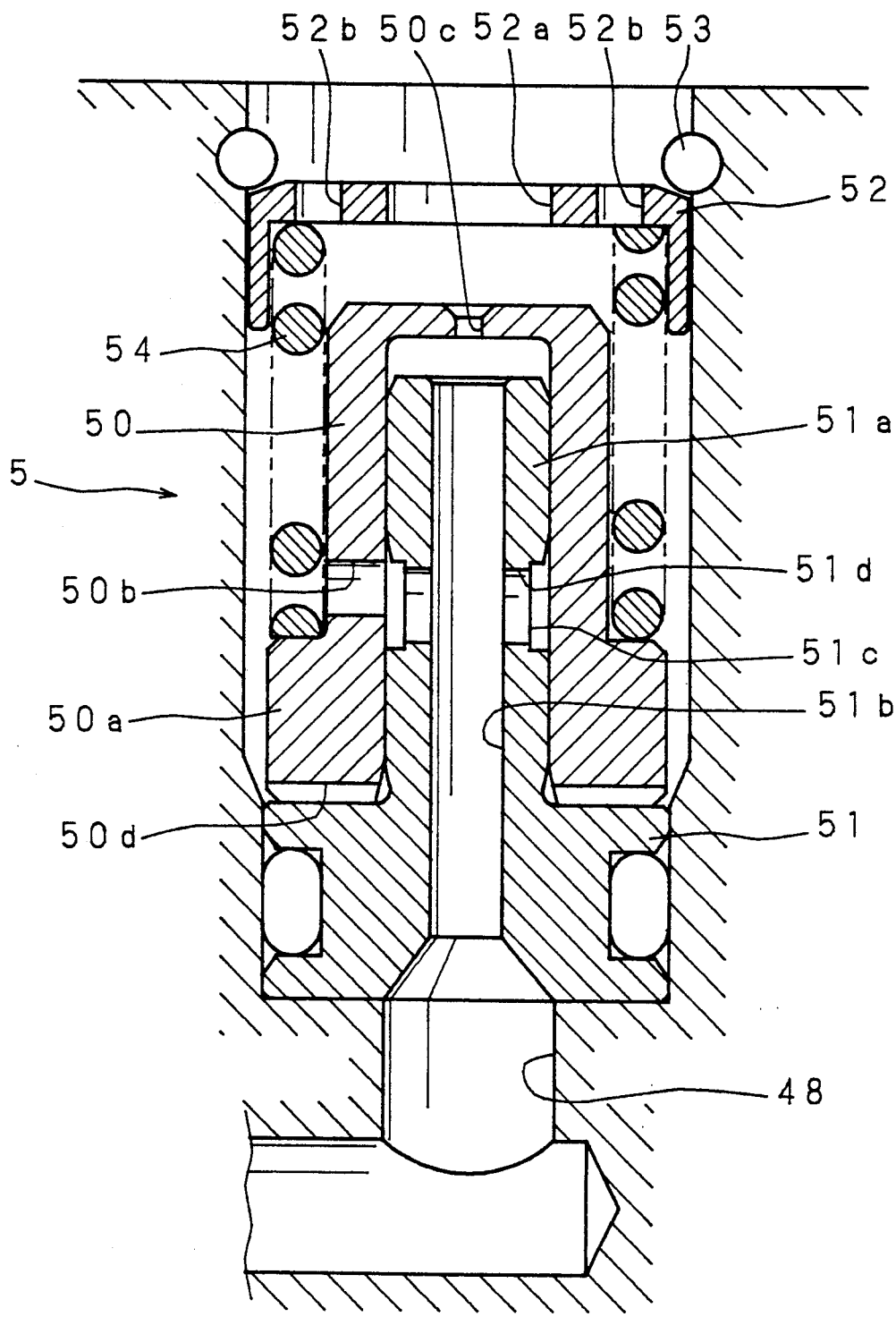
FIG. 7 and FIG. 8 are enlarged longitudinal sectional view of main parts showing the construction of the variable throttle valve of another embodiment of an apparatus according to the present invention.
Figure 8:
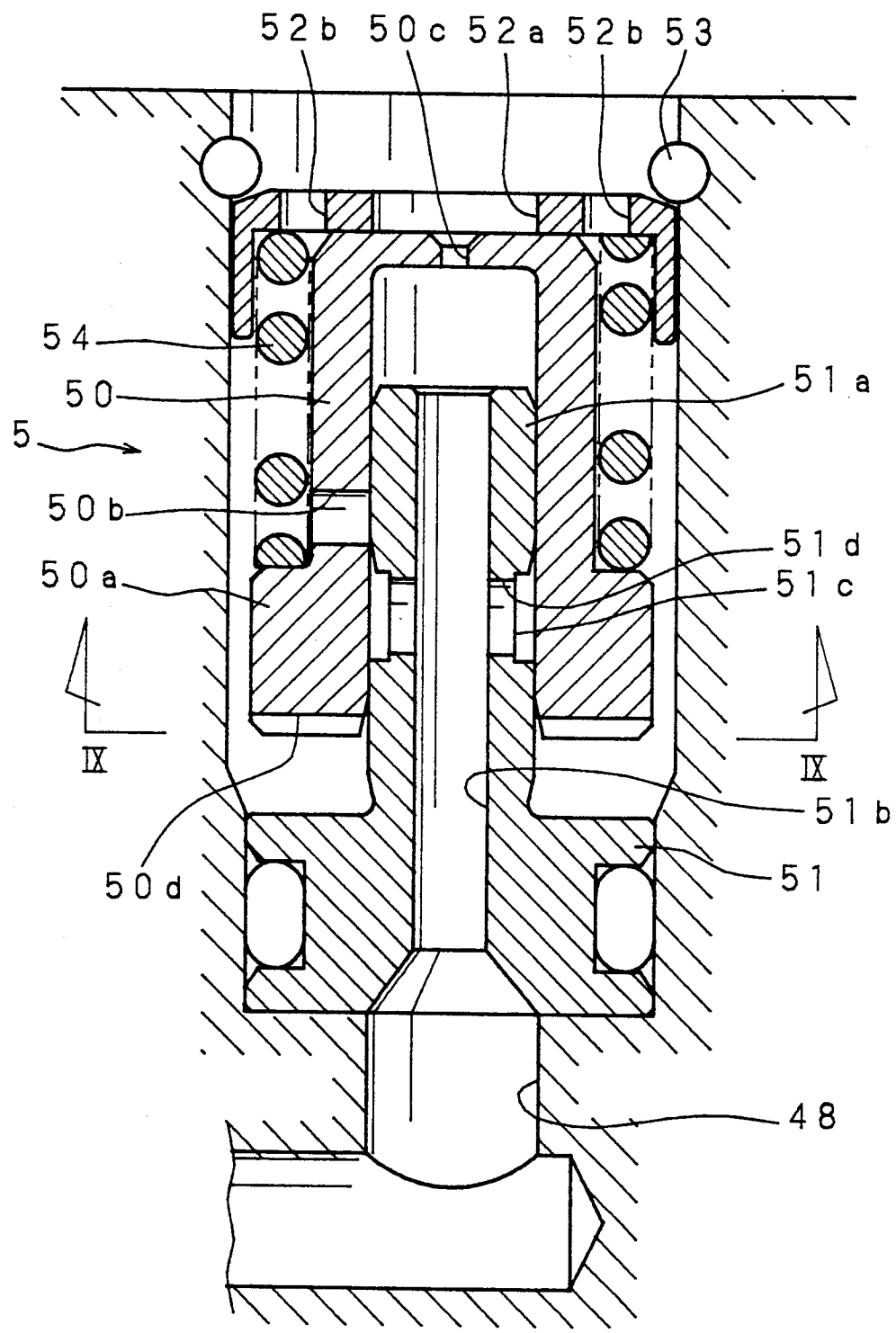
Figure 9:
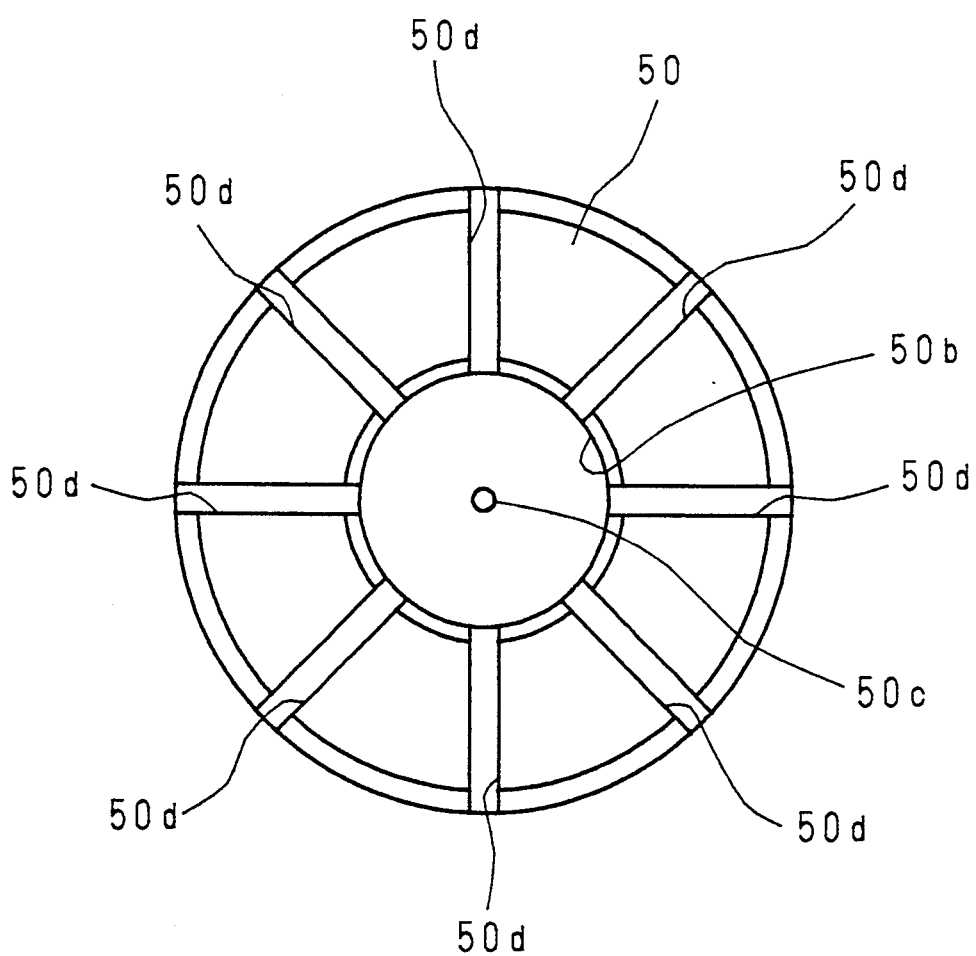
FIG. 9 is a view in the direction of the arrow along the IX—IX line shown in FIG. 8.

FIG. 7 and FIG. 8 are the enlarged longitudinal sectional view showing the construction of a variable throttle valve 5 in another embodiment. FIG. 9 is an view in the direction of the arrow along the IX—IX line shown in FIG. 8.

The variable throttle valve 5 is comprised of the spool 50 which is moved by receiving the generated pressure of the vane pump 3, and restricting members 51 and 52 which restrict the movement of the spool 50. The spool 50, having a bottom and being in the form of a cylinder, is a member which circumferentially provided with a spring flange portion 50a projecting at the opening side in the outward radial direction. At aforesaid spool 50, a fluid passing hole 50b penetrating the peripheral wall inside and outside at a predetermined position in the longitudinal direction is formed. At almost the central portion of the bottom surface, a communicating hole 50c of a small diameter which characterizes the present embodiment, is formed in the state of penetrating both of the bottom surfaces. In addition, the opening side end surface of the spool 50, as shown in FIG. 9, a plurality of fluid grooves 50d, 50d ... communicating the spool 50 inside and outside are formed from the shaft center in a radial manner.

One restricting member 51 is the one in which a column-like guide bar 51a of a small diameter is provided standing- and coaxially on one side of a short column-like main body of a large diameter. At the shaft center position thereof, a pressure introducing hole 51b penetrating aforesaid main body and the guide bar 51a in the longitudinal direction is formed. At a predetermined position on the outer circumferential surface of the guide bar 51a, an annular groove 51c of a rectangular section is formed. The annular groove 51c is communicated with aforesaid pressure introducing hole 51b by the fluid passing hole 51c penetrating the guide bar 51a in the radial direction. As shown in FIG. 7 and FIG. 8, the restricting member 51 is fixedly fitted into the large diameter portion of aforesaid by-pass fluid passage 48 with the head of the guide bar 51a being faced to the fluid tank T side (upside of the figure). The spool 50 is outfitted slidably at aforesaid guide bar 51a. As shown in FIG. 7, the sliding of the spool 50 toward the discharge side (downside of the figure) is restricted by the contact of the end surface of the opening side of the spool 50 and the main body of the restricting member 51. At this time, aforesaid fluid passing hole 50b, at the inside surface side of the spool 50, completely opens into the annular groove 51c at the outer periphery of the guide bar 51a, the opening area of the fluid passing hole 50b being decreased accompanying the sliding of the spool 50 toward the fluid tank T side.

Still more, the other restricting member 52 is the short and thin cylindrical member having a bottom. At the shaft center position of the restricting member 52, a fluid passing hole 52a is formed and at the outside of the fluid passing hole 52a, communicating holes 52b, 52b of small diameter, which characterizes the present embodiment, are formed in the state of penetrating the both surfaces of the bottom board respectively. The restricting member 52 which restricts the sliding of the spool 50 toward the fluid tank T side is fitted into the vicinity of the end portion of the fluid tank T side at the large diameter portion of the bypass fluid passage 48 with the bottom surface thereof being faced to the end portion side. The restricting member 52 is restricted to move toward the fluid tank T side by a snap ring 53 set into the inner periphery of aforesaid large diameter portion. Between the restricting member 52 and the spring flange portion 50a of the spool 50, a coil spring 54 biasing them in opposite directions in which both of them are separated from each other, is interposed. Accordingly, the spool 50 slides corresponding to the balance between the hydraulic pressure which is introduced to the inner side thereof through the by-pass fluid passage and acts upon the bottom surface and against the biasing force of aforesaid coil spring 54. In the case where the aforesaid hydraulic pressure is sufficiently low and the spool 50 is at the position for sliding shown in FIG. 7, the opening area of the fluid passing hole 50b is the maximum. In the case where the hydraulic pressure is sufficiently high and the spool 50 comes in contact with the restricting member 52, that is, the spool is at the position for sliding shown in FIG. 8, the fluid passing hole 50b is closed by the outer circumferential surface of the guide bar 51a, and the opening area of the fluid passing hole 50b is almost zero. In addition, aforesaid opening area between both positions of the spool 50 decreases as the spool 50 slides to the fluid tank T side due to the pressure-rise of aforesaid hydraulic pressure.

In the apparatus of the present invention constructed as above, in the case where the rotation speed difference is generated between the front and rear wheels, relative rotation at the speed corresponding to the rotation speed difference is created between the casing and the rotor 30 of the vane pump 3, as afore-described. Each vane 30a of the rotor 30 is pressed against the inner circumferential surface of the cam ring 31 by the biasing force of coil springs 30b, 30b. In the case where aforesaid relative rotation is created, the hydraulic fluid inside of each pump chamber 40 is rotated accompanying the rotation of the rotor 30, in the state of being confined between the adjoining vane 30a, 30a. The hydraulic fluid in the fluid tank T is drawn into each pump chamber 40 from a suction port 41 which opens at the upstream side in the relative rotational direction through aforesaid suction fluid passage 44 and suction check valve 43 installed on the suction fluid passage 44. The hydraulic fluid is pressurized during its rotation as afore-described, and is discharged from the discharge port 42 which opens at the downstream side in the relative rotation direction. The discharged fluid is drawn to the bottom part of the storage grooves of the vane 30a, 30a ... through the V-turn shaped passage 45 and the discharge check valve 46 installed on the V-turn shaped passage 45. The discharged fluid pressures these vanes 30a, 30a ... in the outward radial direction, then a part of which begins to leak into the hollow part of the side plates 32 and 33 through the gaps at both sides of the rotor 30. The leaked hydraulic fluid flows back to the fluid tank T through aforesaid return hole, and the remains is drawn into the by-pass fluid passage 48, then flows back to the fluid tank T through the variable throttle valve 5 installed on the by-pass fluid passage 48. The hydraulic pressure inside each of the pump chambers 40 is generated resisting the conduction resistance created until the hydraulic fluid flows back to the fluid tank T through aforesaid discharge fluid passage or by-pass fluid passage 48.

The flow resistance of hydraulic fluid increases as the quantity of the introduced hydraulic fluid to the pump chamber 40 and the quantity of the discharged hydraulic fluid from the pump chamber 40 increase, accompanying the increase of the relative rotation speed. Accordingly, with the hydraulic pressure acting in the direction in which aforesaid relative rotation is suppressed between the rotor 30 and the casing being as a mediation, transmission of driving force, corresponding to aforesaid rotation speed difference, is carried out from the rotor 30 to the casing, that is, from the input shaft 1 to the output shaft 2.

The hydraulic pressure generated in such a manner, acts upon the spool 50 of aforesaid variable throttle valve 5 in the process of flowing back to the fluid tank T through the by-pass fluid passage 48. The aforesaid spool 50 slides as afore-described corresponding to the received pressure. In the case where the rotation speed difference is $N_1$ or below, the generated hydraulic pressure in the pump chambers 40, 40, 40 is low, and the force acting upon the spool 50 is lower than the biasing force of the coil spring 54 due to the received pressure, aforesaid spool 50 is at the position for sliding shown in FIG. 7. In this case, the fluid passing hole 50b is in the complete opening state, and the oil passing area in the by-pass fluid passage 48 is maintained to be large. Accordingly, flow resistance at aforesaid fluid passage 48 side becomes smaller, and the increase ratio of the transmission driving force accompanying the increase of the rotation speed difference is maintained to be small, thereby transmission torque being suppressed to be $T_1$ or below. In addition, in the case where the generated pressure is up accompanying with the increase of the rotation speed difference to the extent where it is higher than the biasing force of aforesaid coil spring 54, the spool 50 begins to slide, thereby the opening area of aforesaid fluid passing hole 50b decreases. As a result, the fluid passing area of the by-pass fluid passage 48 decreases and the flow resistance of the fluid passage 48 side increases, the phenomenon that aforesaid generated hydraulic pressure being further increased correspondingly. Accordingly in the period until the spool 50 comes in contact with the restricting member 52, and the sliding of the spool 50 is suppressed in the state of complete closing of the fluid passing hole 50b, that is, during the time when the rotation speed difference is from $N_1$ to $N_2$, the increase ratio of transmission driving force against the increase of the rotation speed difference is very large, thereby the characteristic of transmission driving force which steeply increases as the rotation speed difference increases being obtained. Furthermore, after the sliding of the spool 50 is suppressed, the fluid passing area of the by-pass fluid passage 48 is limited to aforesaid communicating hole 50c of the bottom surface of the spool 50, and the generated pressure inside of the pump chamber 40 shows the state of increase which is determined by conduction resistances at aforesaid communicating hole 50c and aforesaid throttle hole 30c, and conduction resistance at the discharge fluid passage, thereby characteristic of transmission torque which increases gradually against the rotation speed difference being obtained. The communicating hole 50c at the spool 50 and the communicating holes 52b, 52b at the restricting member 52 which characterize the present invention are so provided that the place surrounded by the spool 50 and the restricting member 51 or restricting member 52 is to communicate with the fluid tank T being the low pressure portion when the fluid passing hole 50b is closed. As clear from the FIG. 8 which shows aforesaid closed state, the former, that is, the communicating hole 50c makes the surrounded space between the spool 50 and the restricting member 51 to communicate with the fluid tank T, and the latter, that is, the communicating holes 52b, 52b make the surrounded space between the spool 50 and the restricting member 52 to communicate with the fluid tank T, respectively. In the case where the rotation speed difference created between the front and rear wheels shows a tendency of decrease from the sufficiently large state, the spool 50 returns to the position shown in FIG. 8 to the position shown in FIG. 7, corresponding to the accompanying lowering of the generated pressure at the inside of the pump chamber 40. At this time, the hydraulic fluid confined in the former surrounded space acts as damper at a place between the bottom surface of the spool 50 and the end surface of the guide bar 51a. But in the present embodiment, the hydraulic fluid of aforesaid space flows to the fluid tank T side accompanying the movement of the spool 50 through aforesaid communicating hole 50c, as a result, aforesaid damper effect is greatly decreased, thereby there being no fear that the movement of the spool 50 is obstructed. Still more, at the time of returning of the spool 50, as the hydraulic fluid inside of the fluid tank T flows into the latter surrounded space through aforesaid communicating holes 52b, 52b, aforesaid space is not negative-pressurized accompanying the movement of the spool 50, thereby there being no fear that the movement of the spool 50 is obstructed. In such a way, in the present embodiment, the obstructive factor in the movement of the spool 50 from the closing state to the opening state of the fluid passing hole 50b is eliminated, by the flow of the hydraulic fluid through aforesaid communicating hole 50c and communicating holes 52b, 52b. As a result, the movement of the spool 50 is created almost equally to both directions, thereby hysteresis resulted from the difference of the moving direction of the spool 50 not appearing in the transmission characteristic. Only the characteristic shown in solid line in FIG. 6 is obtained regardless of the moving direction of the spool 50.

The fluid grooves 50d, 50d . . . formed at the end surface of the opening side of the spool 50 usually introduces hydraulic fluid to a place between aforesaid end surface and the end surface of the main body of the restricting member 51, acting to ease the adhering state of both surfaces. The adhesion of aforesaid both surfaces becomes the factor to suppress the start of the movement of aforesaid spool 50 at the time when the hydraulic pressure acting upon the spool 50 is heightened to exceed the biasing force of the coil spring 54, aforesaid movement starting position is able to be stabilized by forming aforesaid oil grooves 50d, 50d . . . , thereby the effect being obtained that the rising position from the first gradual-increase portion to steep-increase portion in the characteristic curve shown in FIG. 6 is almost constant. In addition, it is needless to say that the construction of the variable throttle valve 5 is not limited to the one shown in the present embodiment, and the disposed state of aforesaid variable throttle valve 5 and the by-pass fluid passage 48 also is not limited to the one shown in the present embodiment.

As afore-described, in the apparatus of the present invention, desired transmission characteristic being capable of gaining a small transmission driving force in an area where the rotation speed difference is small and a large transmission driving force in an area where the rotation speed difference is large can be obtained by the operation of the throttle means which is disposed in the by-pass fluid passage by-passing the discharge side of the hydraulic pressure pump to the low pressure portion and is provided with the spool being moved under the action of the generated hydraulic pressure of aforesaid hydraulic pressure pump. Also in the present apparatus, hysteresis due to the moving direction difference of the spool does not appear in aforesaid transmission characteristic because the factor to obstruct the movement of the spool is eliminated by the flow of hydraulic fluid passing through the communicating hole formed at aforesaid spool or the restricting member therefor, and aforesaid desired transmission characteristic is usually gained, thereby uncomfortable feeling resulting from aforesaid hysteresis not being created.

Next, explanation will be given on still another embodiment of the present invention. In the two embodiments afore-described, the desired transmission characteristic wherein steep-increase portion being held between the two gradual-increase portions can be obtained by disposing the variable throttle valve in the by-pass fluid passage.

By the way, in working vehicle such as a tractor and the like where steering angle at the time of turning is extremely large, the rotation speed difference between the front and rear wheels at the time of turning is large due to the difference of radii in turning between the front and rear wheels. In such a case, if the transmission force of the driving force between the front and rear wheels is large, not only the bad steering feeling is brought about because the rear wheels slip, but there is a fear that a propeller shaft between the front and rear wheels is twisted to damage the road surface as well. In addition, in aforesaid working vehicles, the running making the most of the characteristic of afore-described four-wheel drive vehicles is necessary at the time of running straight when the rotation speed difference between the front and rear wheels is small. In such a way, in working vehicles used for specific services, not only the transmission characteristic of such a driving force but various kinds of aforesaid transmission characteristics are required to be realized.

A hydraulic transmission coupling apparatus provided with a variable throttle valve 5 as afore-described has, however, only a simple characteristic that the transmission force of the driving force is increased according to the increase of the rotation speed difference between the front and rear wheels, thereby there being a problem that various kinds of characteristics required for aforesaid working vehicles cannot be realized.

In this embodiment, a fixed throttle valve is provided in the by-pass fluid passage, and the opening area of the variable throttle valve varies by the hydraulic pressure generated by the operation of the fixed throttle valve.

Figure 10:
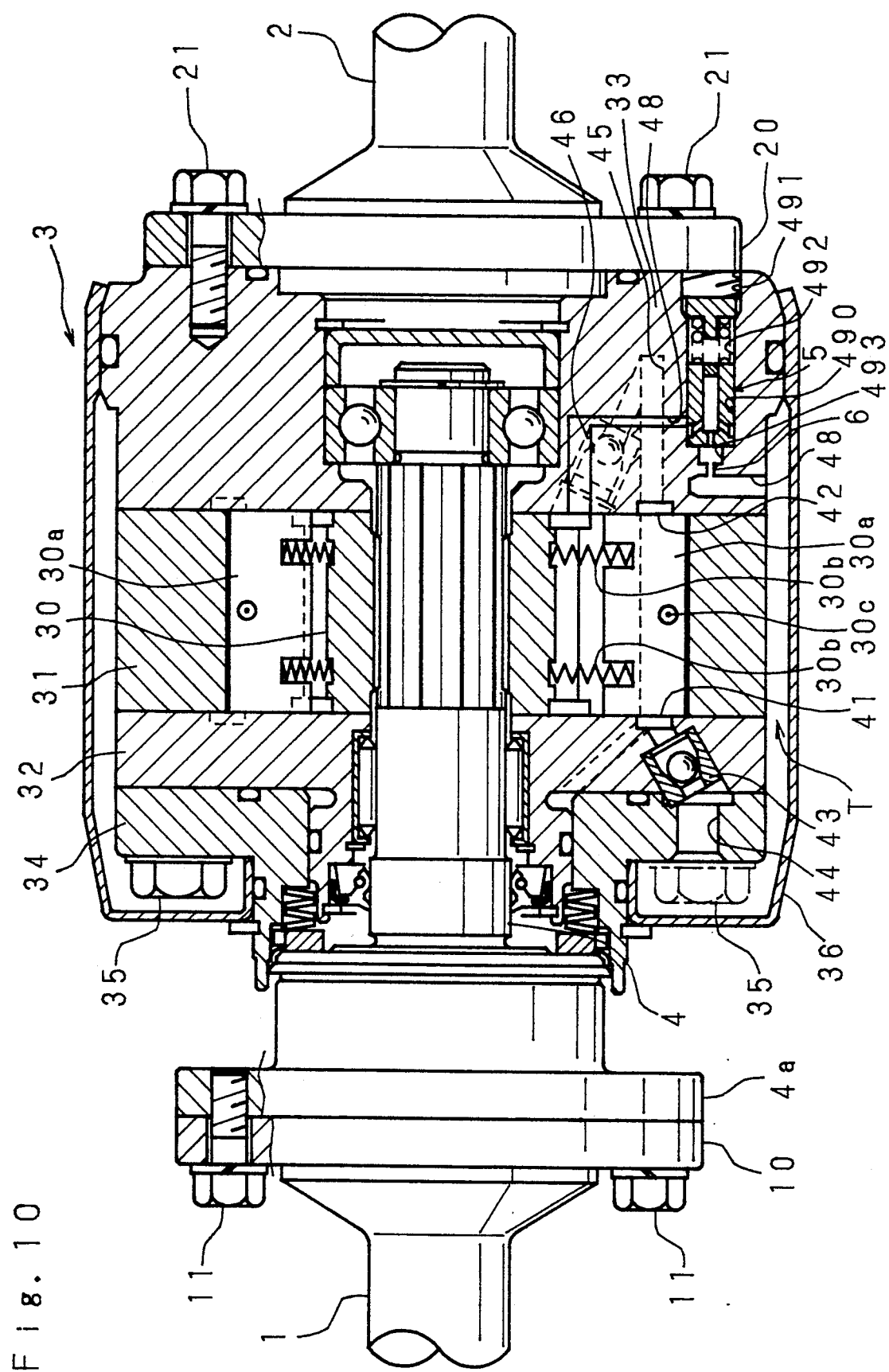
FIG. 10 is a longitudinal sectional view of the hydraulic transmission coupling apparatus of still another embodiment.

FIG. 10 is a longitudinal sectional view of the hydraulic transmission coupling apparatus of the present embodiment. In addition, the explanation on the construction thereof is given only with reference to the parts different from those of above-described two embodiments. In this embodiment, the construction of the by-pass fluid passage 48 and provision of a throttle hole 30c penetrating both surfaces of each vane 30 are the different points from aforesaid two embodiments.

The by-pass fluid passage 48, as shown in the figure, is comprised of the first portion which extends axially across the width of the side plate 33 from the bottom part of the storage grooves of the vane 30a, 30a . . . , and is formed with an appropriate length, and a second portion which extends transverse to the first portion and is formed with an appropriate length in the inward radial direction from the outer circumferential surface of the side plate 33.

A stepped cavity 490 is formed wherein a cavity of circular section having three diameters of large diameter portion 491, middle diameter portion 492 and small diameter portion 493 is formed successively coaxially from the outer end surface of the side plate 33 to the width direction thereof. In the stepped cavity 490, the axial length of the middle diameter portion 492 is the maximum, followed by that of the large diameter portion 491 and that of the small diameter portion 493 in this order. In addition, the large diameter portion 491 is communicated with the second portion of aforesaid by-pass fluid passage 48 through a throttle fluid passage 6. Furthermore, the middle diameter portion 492 is communicated with the V-turn shaped passage 45 through the first portion of aforesaid by-pass fluid passage 48. And inside of the stepped cavity 490 so constructed as above, the variable throttle valve 5 is constructed.

Figure 11:
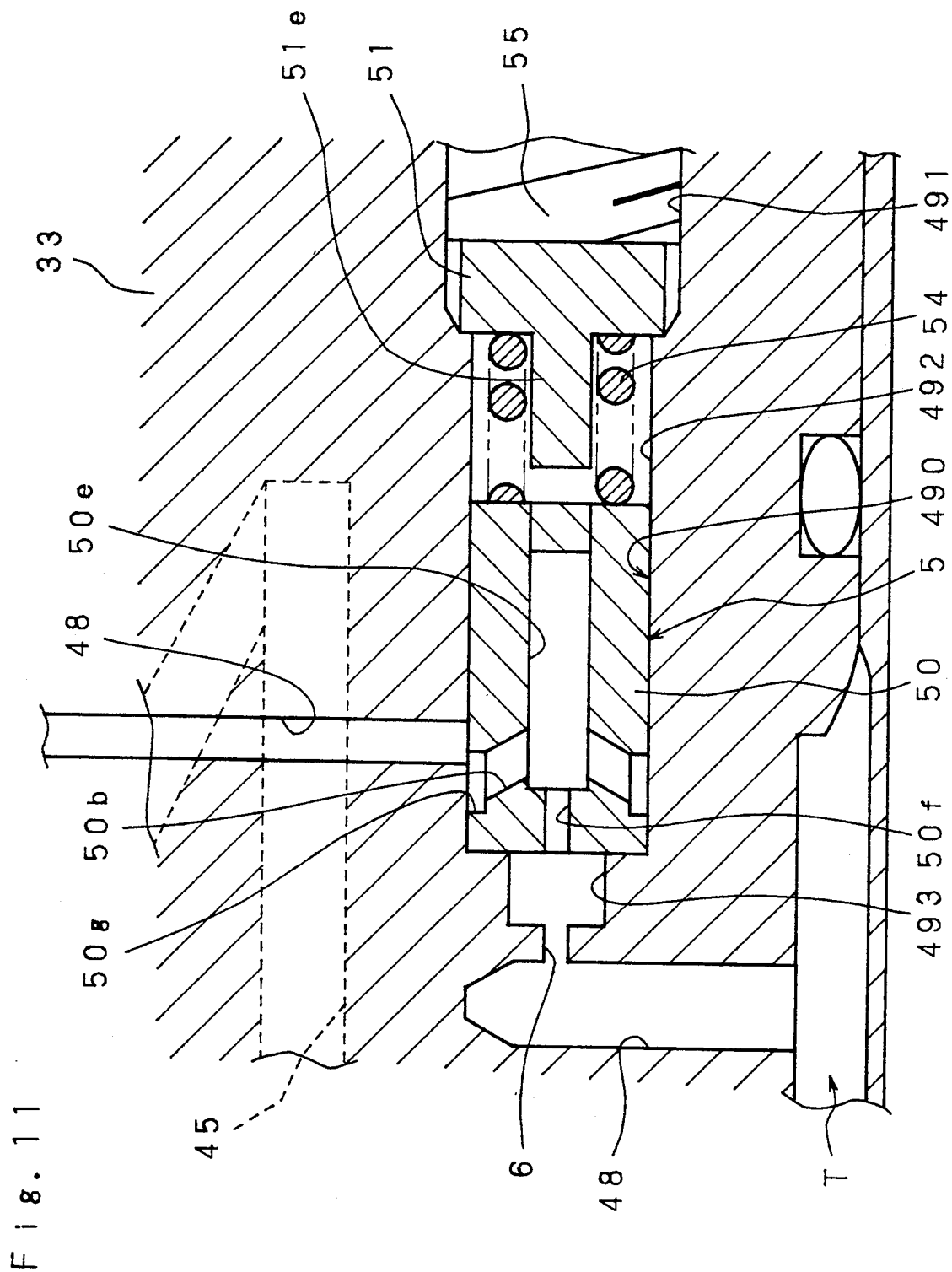
FIG. 11 and FIG. 12 are enlarged longitudinal sectional views of main parts showing the construction of the variable throttle valve of still another embodiment.
Figure 12:
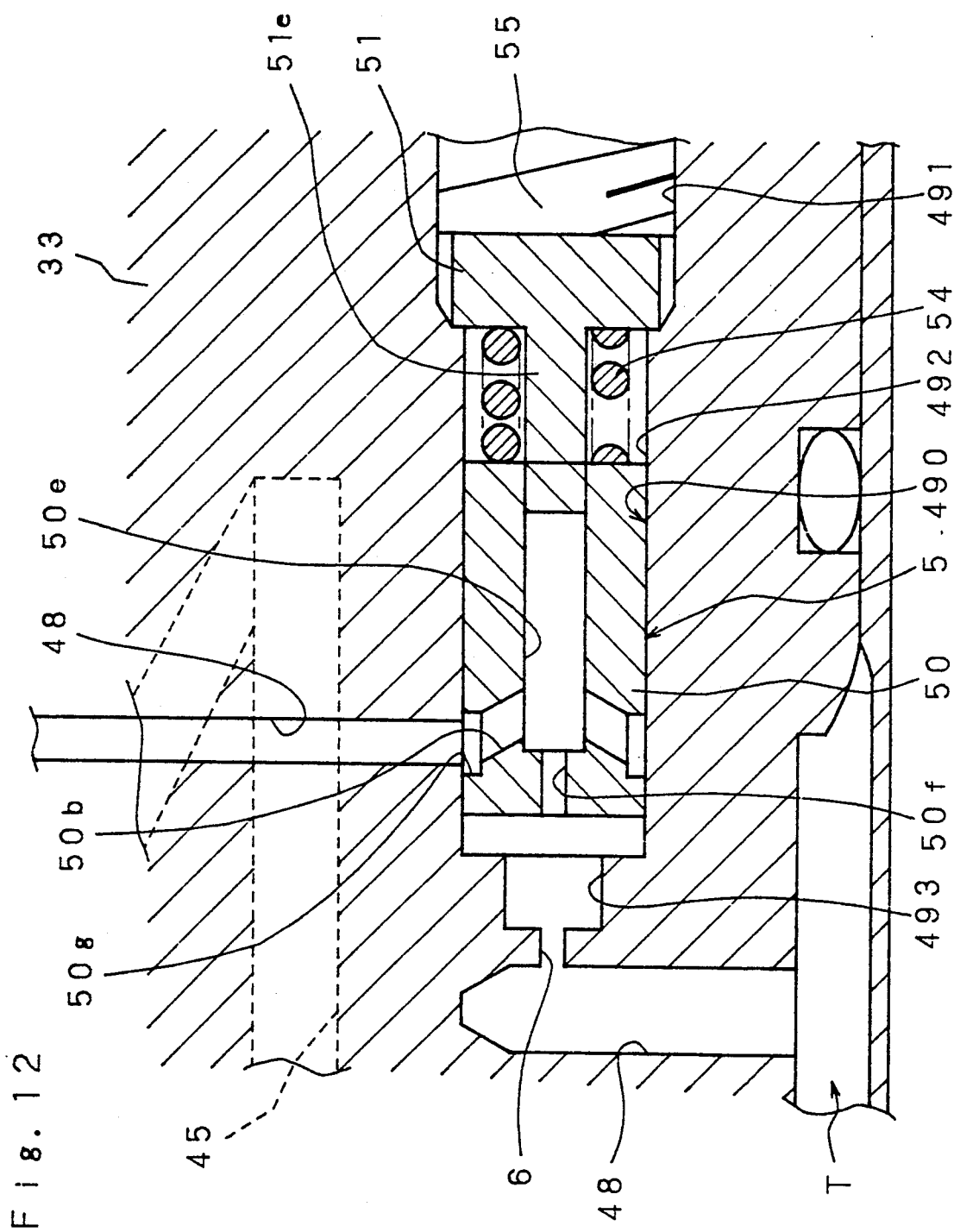

FIG. 11 and FIG. 12 are the enlarged longitudinal sectional view of main parts showing the construction of the throttle oil passage 6 and the variable throttle valve 5.

The spool 50 is moved under the pressure of fluid in the small diameter portion 493, and the restricting member 51 which restricts the movement of the spool 50.

The spool 50 is a cylindrical member which has almost the same diameter the middle diameter portion 492, and is provided slidably in the direction of axial length inside the middle diameter portion 492 of the stepped cavity 490. Inside of the spool 50, a cylindrical pressure introducing chamber 50e is provided. At almost the central part of the end surface of the spool 50 facing toward the small diameter portion 493, a communicating hole 50f of a small diameter is formed. The hole 50f communicates pressure chamber 50e of the spool with the small diameter portion 493 end. Still more, at a predetermined position on the outer circumferential surface of the spool 50, an annular groove 50g of a rectangular section is formed. This is communicated with aforesaid pressure introducing chamber 50e through the fluid passing hole 50b which inclines at a predetermined angle against the shaft center line of the spool 50 and penetrates it in the radial direction. But aforesaid annular groove 50g is formed at such a position that a part of the large diameter portion 491 side of the annular groove 50g opens a part of the opening portion of the first portion of the by-pass fluid passage 48, in the case where the end surface of the spool 50, being at the communicating hole 50f side, comes in contact with the small diameter portion 493 side.

The restricting member 51 is the one which is constructed in such a manner that a cylindrical restricting bar 51e of a small diameter extends from an end surface of a short cylindrical main body of a large diameter coaxially. Aforesaid restricting member 51 is fitted into the large diameter portion 491 of the stepped cavity 490 with the restricting bar 51e projecting into the middle diameter portion 492. The movement of the restricting member 51 in the direction of axial length is restricted by a bolt 55 screwed from the outside surface of the side plate 33 into the body thereof. At a place between aforesaid restricting member 51 and the spool 50, the coil spring 54 which biases both of them away from each other is interposed. Accordingly, the spool 50 slides corresponding to the balance between the hydraulic pressure, which is introduced from the first portion of the by-pass fluid passage 48 to the small diameter portion 493 through the annular groove 50g, fluid passing hole 50b, pressure introducing room 50e and communicating hole 50f and is pressured up by the operation of the throttle fluid passage 6, and the energizing force of aforesaid coil spring 54. In the case where aforesaid hydraulic pressure is sufficiently low and the spool 50 is positioned at a place shown in FIG. 11, the opening area of the first portion of the by-pass fluid passage 48 is the minimum. In addition, in the case where aforesaid hydraulic pressure is sufficiently high, and the spool 50 comes in contact with the restricting member 51, that is, it is at a position shown in FIG. 12, the opening area of the first portion of the by-pass fluid passage is the maximum.

In the embodiment as constructed above, in the case where the rotation speed difference is created between the front and rear wheels, relative rotation at the speed corresponding to the rotation speed difference is created between the casing and the rotor 30 of the vane pump 3, as afore-described. Each vane 30a of the rotor 30 is pressed against the inner circumferential surface of the cam ring 31 by the baising force of coil spring 30b, 30b. In the case where aforesaid relative rotation is created, the hydraulic fluid of each pump chamber 40 is made to be rotated accompanying the rotation of the rotor 30 in the state of being confined between the adjoining vanes 30a, 30a. The hydraulic fluid in the fluid tank T is drawn to each pump chamber 40 from the suction port 41 opening at the upstream side in the direction of relative rotation through aforesaid suction fluid passage 44 and the suction check valve 43 installed in the suction fluid passage 44. The hydraulic fluid is pressurized up while it is made to rotate as aforementioned, and is discharged from the discharge port 42 opening at the downstream side in the direction of relative rotation. The discharged hydraulic fluid is drawn to the bottom part of the storage grooves of the vanes 30a, 30a ... through the V-turn shaped passage 45 and the discharge check valve 46 installed in the V-turn shaped passage 45. After discharged hydraulic fluid pressures these vanes 30a, 30a ... to the outward radial direction, a part thereof begins to leak to the hollow parts of the side plates 32 and 33 to return to the fluid tank T through aforesaid return hole, the remains being drawn into the by-pass fluid passage 48 to be returned to the fluid tank T through the variable throttle valve 5 and the throttle fluid passage 6 installed in the by-pass fluid passage 48. Now, in the process of pressurizing of the pump chamber 40, a part of the hydraulic fluid confined between the vanes 30a, 30a passes through the throttle hole 30c of an extremely small diameter (refer to FIG. 10) formed at respective vanes 30a, 30a ... to be leaked into the similar confined space at low pressure side (upstream side of the direction of relative rotation). The hydraulic pressure of each of the pump chambers 40, 40, 40 is because of flow resistance created at the throttle hole 30c, and the flow resistance created at aforesaid discharge fluid passage or by-pass fluid passage 48 while hydraulic fluid is returning to the fluid tank T. As the flow resistance of hydraulic fluid increases accompanying the increase of relative rotation speed as the quantity of introduced hydraulic fluid to the pump chamber 40 and the quantity of discharged hydraulic fluid therefrom increase, the transmission of driving force corresponding to aforesaid rotation speed difference is carried out from the rotor 30 to the casing, that is, from the input shaft 1 to the output shaft 2 with the fluid pressure acting to suppress aforesaid relative rotation between the rotor 30 and the casing.

In this way, the quantity of flow of the discharged hydraulic fluid discharged from the discharge port 42 increases as the rotation speed difference between the front and rear wheels increases. In the process of returning of the discharged hydraulic fluid to the fluid tank T through the by-pass fluid passage 48, when the flow rate thereof increases, the hydraulic pressure in the small diameter portion 493 of the variable throttle valve 5 is increased by the throttling effect of the throttle fluid passage 6, the hydraulic pressure acting upon the spool 50. The spool 50 slides as aforementioned according to the received pressure. In the case where the generated hydraulic pressure in the pump chambers 40, 40, 40 is low, the flow rate of the pressurized hydraulic fluid is low, the hydraulic pressure in the small diameter portion 493 is low, and the force acting upon the spool 50 by the received pressure is lower than the biasing force of coil spring 54, the spool 50 is at the position for sliding shown in FIG. 12, and the first portion of the by-pass fluid passage 48 is in the state of slight opening. In aforesaid state of slight opening, as the oil passing area at the by-pass fluid passage 48 is kept to be small and the flow resistance of aforesaid fluid passage 48 side is large, the decrease of transmission driving force accompanying the increase of rotation speed difference is kept to be small, thereby a first gradual-declining portion shown in FIG. 13 being obtained. In addition, in the case where the hydraulic pressure in the small diameter portion 493 is increased as the rotation speed difference increases to exceed the biasing force of aforesaid coil spring 54, the spool 50 begins to slide and the opening area of aforesaid fluid passing hole 50b increases. As a result, the fluid passing area of the by-pass fluid passage 48 increases and the conduction resistance of aforesaid fluid passage 48 side decreases, and corresponding to these facts, such phenomenon as aforesaid generated hydraulic pressure further decreases is generated. Accordingly, in a period when the spool 50 comes in contact with the restricting bar 51e of the restricting member 51, and the sliding of the spool 50 is suppressed with the first portion of the by-pass fluid passage 48 being completely opened, the decrease rate of the transmission driving force against the increase of the rotation speed difference is extremely large, thereby such characteristic as the transmission driving force steeply decreases as the rotation speed difference increases, that is, the steeply-declining portion shown in FIG. 13 being obtained. Furthermore, after the sliding of the spool 50 is suppressed, the fluid passing area of the by-pass fluid passage 48 is kept to be constant, the transmission force is kept at constant value, and the decrease of transmission driving force accompanying the increase of the rotation speed difference is kept to be small, thereby a second gradual-declining portion shown in FIG. 13 being obtained.

In the apparatus of the present invention, in the case where the end surface of the spool 50, being at the communicating hole 50f side, comes in contact with the small diameter portion 493 side, the annular groove 50g is formed at such a position that the first portion of the by-pass fluid passage 48 is made to open, thereby an opposite characteristic to the one aforementioned being obtained, as shown in a broken line in FIG. 13. This characteristic is like the one of the conventional transmission coupling apparatus. That is, when the rotation speed difference is small, small transmission force is obtained, and when the rotation speed difference is large, large transmission force is obtained.

In the apparatus of the present invention, other than aforesaid transmission characteristic of the driving force, various kinds of characteristics, such as a characteristic carrying out the increase and decrease of the transmission force in a combined manner corresponding to the increase of the rotation speed difference, for example, can be realized by changing the positional relation between the annular groove 50g and the opening portion of the first portion of the by-pass fluid passage 48.

In addition, it is needless to say that the construction of the variable throttle valve 5 is not limited to the one shown in the present embodiment, and the state of disposing aforesaid throttle fluid passage 6 and the by-pass fluid passage 48 is not limited to the one shown in the present embodiment.

As aforementioned, in the present embodiment, variable throttle means and fixed throttle means are disposed in this order at a by-pass fluid passage provided at the discharge side of a hydraulic pressure pump, so that the pressure is changed by the operation of the fixed throttle means according to quantity of flow of the hydraulic pressure pump, the variable throttle means operating to open/close the by-pass fluid passage by the pressure. Accordingly, in the case where the rotation speed difference between the front and rear wheels is large and the quantity of flow of discharged fluid from the hydraulic pressure pump increases, various kinds of driving force transmission characteristics, such as the one where the driving force transmission force decreases according to the increase of flow quantity of the discharged fluid, are possible to be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A hydraulic transmission coupling apparatus for transmitting driving force to two rotary shafts having different rotational speeds, respectively, said apparatus comprising:
   a hydraulic pump connected between the two rotary shafts and generating a hydraulic pressure corresponding to a relative rotational speed difference between the rotational speeds of the two shafts, said hydraulic pump having a discharge port;
   a tank for storing hydraulic fluid to be supplied to said hydraulic pump;
   means defining a passage providing communication between said pump discharge port and said tank; and
   variable throttle means disposed in said passage and having:
      an opening whose area varies,
      a spool movable under action of the pump generated hydraulic pressure to vary the area of said opening, and
      means for restricting movement of said spool to restrict the variation of the area of said opening.

2. A hydraulic transmission coupling as set forth in claim 1 wherein the throttle means causes the area of said opening to become smaller as the relative rotational speed difference becomes larger.

3. A hydraulic transmission coupling as set forth in claim 1 wherein hydraulic pump is a vane pump including:
   a casing having an eccentric cylindrical cam ring connected with one of the two shafts for joint rotation therewith, and two side plates arranged on opposite sides of said cam ring, respectively, and defining therewith an inner cavity; and
   a cylindrical rotor connected with the other of the two shafts for joint rotation therewith, supported in said inner cavity for relative rotation with respect to said cam ring, and having a plurality of radially extending vanes.

4. A hydraulic transmission coupling apparatus as set forth in claim 3 wherein each of said plurality of vanes has opposite side surfaces and a throttle hole extending through said side surfaces.

5. A hydraulic transmission coupling apparatus as set forth in claim 1 wherein said spool is movable between a first position in which said opening is fully closed, and a second position in which said opening is fully open, said restricting means comprising a restricting member defining with said spool a cavity, said spool having a passage that communicates said cavity with said tank in the first position of said spool.

6. A hydraulic transmission coupling apparatus as set forth in claim 1 wherein said spool is movable between a first position in which said opening is fully closed, and a second position in which said opening is fully open, said restricting means comprising a restricting member defining with said spool a cavity and having a passage that communicates said cavity with said tank in the first position of said spool.

7. A hydraulic transmission coupling apparatus as set forth in claim 1 wherein said spool is movable between a first position in which said opening is fully closed, and a second position in which said opening is fully open, said restricting means comprising a restricting member defining with said spool a cavity, said spool and said restricting member forming jointly a passage that communicates said cavity with said tank in the first position of said spool.

8. A hydraulic transmission coupling apparatus as set forth in claim 1 wherein said spool has a surface contacting a respective contact surface of said restricting member, and at least one radially extending groove formed on said contacting surface of said spool.

9. A hydraulic transmission coupling apparatus as set forth in claim 1, further comprising fixed throttle means disposed in said passage and having an opening with a constant cross-sectional area, said spool being movable under action of a hydraulic pressure generated as a result of operation of said fixed throttle means.

10. A hydraulic transmission coupling apparatus as set forth in claim 9 wherein the area of said opening of said variable throttle means becomes larger as the relative rotational speed difference becomes larger.

11. A hydraulic transmission coupling apparatus as set forth in claim 9 wherein the area of said opening of said variable throttle means becomes smaller as the relative rotational speed difference becomes larger.

* * * * *